(12) United States Patent  (10) Patent No.: US 11,751,138 B2
Rössl  (45) Date of Patent: Sep. 5, 2023

(54) ELECTRONIC SHELF TAG SYSTEM WITH STANDARDIZED RADIO COMMUNICATION PROTOCOL

(71) Applicant: SES-IMAGOTAG GMBH, Fernitz-Mellach (AT)

(72) Inventor: Andreas Rössl, Fernitz-Mellach (AT)

(73) Assignee: SES-IMAGOTAG GmbH, Fernitz-Mellach (AT)

( * ) Notice: Subject to any disclaimer, the term of this patent is extended or adjusted under 35 U.S.C. 154(b) by 0 days.

(21) Appl. No.: 17/617,698

(22) PCT Filed: Jun. 17, 2019

(86) PCT No.: PCT/EP2019/065894
§ 371 (c)(1),
(2) Date: Dec. 9, 2021

(87) PCT Pub. No.: WO2020/253940
PCT Pub. Date: Dec. 24, 2020

(65) Prior Publication Data
US 2022/0240184 A1   Jul. 28, 2022

(51) Int. Cl.
*H04W 52/02* (2009.01)
*H04W 84/18* (2009.01)
*H04W 76/27* (2018.01)

(52) U.S. Cl.
CPC ... *H04W 52/0229* (2013.01); *H04W 52/0206* (2013.01); *H04W 52/0216* (2013.01);
(Continued)

(58) Field of Classification Search
CPC ......... H04W 52/0229; H04W 52/0206; H04W 52/0216; H04W 52/0219; H04W 52/0274;
(Continued)

(56) References Cited

U.S. PATENT DOCUMENTS 8,095,812 B2 * 1/2012 Cho ...................... G06F 1/3203
713/323
2005/0150949 A1 * 7/2005 Goel .................. G06K 19/0723
235/383

(Continued)

*Primary Examiner* — Andrew Wendell
(74) *Attorney, Agent, or Firm* — Dennemeyer & Associates, LLC

(57) ABSTRACT

Electronic shelf label system that has: at least one battery-operated shelf label client that has an energy-saving sleep mode without radio communication standby according to a radio standard and an active mode with radio communication standby according to the radio standard and that has a radio wake-up receiver designed so as, on receiving a wake-up signal, to leave the sleep mode and prompt the active mode to be adopted, and an access point that is designed for radio communication with the at least one shelf label client according to the radio standard and that has a radio wake-up transmitter for transmitting the wake-up signal, wherein the radio wakeup transmitter is designed to be controllable in terms of the time at which the wake-up signal is transmitted by the access point, and the access point defines the time as the initiation of a radio connection setup to the at least one shelf label client according to the radio standard, in particular with a lead time for changing from the sleep mode to the active mode.

13 Claims, 6 Drawing Sheets

(52) U.S. Cl.
CPC ... *H04W 52/0219* (2013.01); *H04W 52/0274* (2013.01); *H04W 76/27* (2018.02)

(58) Field of Classification Search
CPC ..... H04W 76/27; H04W 52/46; H04W 84/12; H04W 84/18; H04W 88/04; H04W 76/28; H04W 52/44; H04W 88/08; H04W 52/02; H04W 52/0235; Y02D 30/70
See application file for complete search history.

(56) References Cited

U.S. PATENT DOCUMENTS

| | | | |
|---|---|---|---|
| 2006/0163349 A1* | 7/2006 | Neugebauer | G06Q 20/387 235/383 |
| 2007/0181678 A1* | 8/2007 | Nilsson | G06Q 30/00 235/383 |
| 2007/0188340 A1* | 8/2007 | Kimura | H04W 68/00 340/691.6 |
| 2009/0243873 A1* | 10/2009 | Mizukawa | G06F 3/147 340/4.32 |
| 2015/0199942 A1* | 7/2015 | Mochizuki | G06F 3/147 345/1.3 |
| 2015/0296383 A1* | 10/2015 | Choi | H04W 16/14 370/252 |
| 2015/0310775 A1* | 10/2015 | Cho | G09F 3/02 40/299.01 |
| 2018/0270734 A1* | 9/2018 | Kali | G06F 3/1423 |
| 2018/0357451 A1* | 12/2018 | Tingler | G06K 7/10198 |
| 2020/0275375 A1* | 8/2020 | Liu | H04W 52/0235 |

* cited by examiner

ELECTRONIC SHELF TAG SYSTEM WITH STANDARDIZED RADIO COMMUNICATION PROTOCOL

TECHNICAL FIELD

The invention relates to an electronic shelf label system with standardized wireless communication protocol.

BACKGROUND

An electronic shelf label system, in which a standardized wireless communication protocol is used, is known for example from US 2018/0270734A1. The system has a plurality of shelf labels and an access point for wireless communication with the said shelf labels. The access point is WLAN-enabled. The shelf labels are Bluetooth-enabled. Between the access point and the shelf labels, a relay station functions as an access node for a group of shelf labels logically assigned to the relay station. The relay station is WLAN-enabled, in order to be able to communicate with the access point, and Bluetooth-enabled, in order to be able to communicate with the shelf labels.

The relay station together with the shelf labels assigned to it forms a mesh network, in which information, which is intended for a particular shelf label, is initially received by the relay station and is then forwarded from the relay station to the first shelf label and is then communicated further from the shelf label to the next shelf label until the information reaches the shelf label that is actually addressed. In order supposedly to ensure energy efficiency, Bluetooth low energy wireless modules are used in the mesh network.

Actually, the known system has proven disadvantageous in multi respects when relay stations and shelf labels operated using rechargeable batteries or batteries are used.

So, in principle, a separate relay station must be available for each mesh network. A relay station of this type has a relatively high power consumption during connection set-up and communication with the access point according to a WLAN standard, because this form of wireless communication is fundamentally "energy-hungry".

Furthermore, the forwarding of information in the mesh network requires that two nodes (devices) of the mesh network are always active in pairs. This may be the relay station and one of the shelf labels or even two shelf labels. Therefore, without further precautions, the energy supply of those mesh network devices that are involved in communication processes more often is more strongly loaded than that of those that are less often active. This effect does not have anything to do with the actual processing of the information at the shelf label that is ultimately addressed, but rather occurs on its own due to the specific manner of forwarding of information over a chain of network nodes. This has the consequence in the case of (rechargeable) battery operated relay stations, that the energy storage devices have to be replaced or topped up in non-uniform time intervals. The non-uniform energy requirement and the large number of relay stations may lead to a high failure rate in the system and a high maintenance outlay is required to prevent this.

Against this background, the object of the invention is to provide an improved shelf label system, in which the previously mentioned problems are overcome.

SUMMARY OF THE INVENTION

This object is achieved by an electronic shelf label system, which comprises: at least one (rechargeable) battery operated shelf label client, which comprises an energy-saving sleep mode without wireless communication readiness according to a wireless standard and an active mode with wireless communication readiness according to the wireless standard, and which comprises a wireless wake-up receiver, which is designed to cause the quitting of the sleep mode and the adoption of the active mode when a wake-up signal is received, and an access point which is designed for wireless communication according to the wireless standard, particularly with the at least one shelf label client, and which comprises a wireless wake-up transmitter for transmitting the wake-up signal, wherein the wireless wake-up transmitter is designed to be controllable by the access point with regards to the time of transmission of the wake-up signal and the access point defines the time as the initiation of a wireless connection set-up according to the wireless standard for the at least one shelf label client, particularly with wait time for the change from the sleep mode to the active mode.

The object is additionally achieved by a method for operating an electronic shelf label system, wherein the system comprises at least one (rechargeable) battery operated shelf label client, which comprises an energy-saving sleep mode without wireless communication readiness according to a wireless standard and an active mode with wireless communication readiness according to the wireless standard, and wherein the system furthermore comprises an access point, which is designed for wireless communication according to the wireless standard, particularly with the at least one shelf label client, wherein according to the method, under the control of the access point with the aid of a wireless wake-up transmitter of the access point, a wake-up signal is sent at the time at which a wireless connection set-up according to the wireless standard is to be initiated in the at least one shelf label client, particularly with sufficient wait time for a change from the sleep mode to the active mode, and wherein in the at least one shelf label client, the wake-up signal is received with the aid of a wireless wake-up receiver and the sleep mode is quit and the active mode is adopted.

The object is furthermore achieved by the use of a wake-up signal in an electronic shelf label system, which comprises at least one (rechargeable) battery operated shelf label client and an access point for communication according to a wireless standard, particularly with the at least one shelf label client, in order to transfer the at least one shelf label client from its energy-saving sleep mode without wireless communication readiness according to the wireless standard to its active mode with wireless communication readiness according to the wireless standard at a time at which a wireless connection set-up according to the wireless standard is to be initiated in the at least one shelf label client, particularly with sufficient wait time for the change from the sleep mode to the active mode, wherein at the access point, a wireless wake-up transmitter is used for sending the wake-up signal and at the shelf label client, a wireless wake-up receiver is used for receiving the wake-up signal.

The measures according to the invention are associated with the advantage that no wireless communication according to a wireless standard is necessary for the initialization of the connection set-up between the access point and one of the shelf label clients. The wireless standard is first used during the actual connection set-up with the access point. While the shelf label client remains in sleep mode, it is absolutely sufficient that of the entire electronics of the shelf label client, only the wireless wake-up receiver is operating, that is to say is supplied with power. All other electronic components can be switched off, that is to say switched to an unpowered state and/or not clocked. This relates in particular to the client wireless module (transceiver module), which the shelf label client has for the purpose of wireless communication according to the wireless standard.

This leads to an extremely energy-efficient operation of each of the shelf label clients, which, when considered in summary, improves the energy efficiency of the entire shelf label system, which in larger businesses may sometimes have up to 20,000 or more shelf label clients. This in turn has a considerable positive influence on the system-wide maintenance costs and ultimately the system maintenance intensity, because the intervals for battery replacement in the shelf label clients are lengthened extremely. The batteries of the shelf label clients can be disposable batteries or chargeable.

Finally, system behaviour in terms of wireless technology is also improved, because each (attempt at a) connection set-up according to a wireless standard is always associated with considerable wireless traffic, but the wireless performance of the access points usually used is relatively low. Conventional access points can namely only operate a few clients according to a wireless standard. According to the invention, such (an attempt at) a connection set-up according to the wireless standard only occurs if this is requested via a wireless signal transmission of the wireless wake-up signal which deviates from the said wireless standard. This also contributes to the relevant frequency band or the relevant wireless channel, which should be used for wireless communication according to the wireless standard, remaining undisturbed, specifically until wireless traffic according to the wireless standard is actually required. Thus, even the access points are relieved of unnecessary wireless traffic, which has a considerable positive influence on their availability and ultimately their data throughput.

Further particularly advantageous embodiments and developments of the invention result from the dependent claims and also the following description. In this case, features of one claim category can be developed in accordance with the features of the other claim category, so that the effects and advantages listed in connection with the one claim category are also present for the other claim categories.

In principle, the wireless wake-up receiver can also have an idle state and a receiving state and for example change periodically from the idle state to the receiving state and back again, such as e.g. every 50 ms. This operating behaviour can also have a positive influence on energy efficiency. However, it may occur in the rest state that the wireless wake-up receiver misses a wake-up signal, which may again lead to delays in communication handling in the system. It has therefore proven particularly advantageous if the wireless wake-up receiver is permanently in the ready-to-receive state. This prevents a wireless wake-up signal sent by the access point from being missed. This allows the access point also to send the wake-up signal at any desired time and, that aside, also to assume that the wireless wake-up receiver has received the sent wake-up signal and is reacting accordingly. This measure therefore makes a considerable contribution to operational reliability. Furthermore, this measure also allows an extremely energy-saving operation of the wireless wake-up receiver, particularly without modulating the power consumption, rather with constant power consumption and therefore an excellent predicted maximum expected battery life. This in turn makes a considerable contribution to failure safety.

Particularly preferably, a wireless wake-up receiver of this type has a current consumption of less than 3 µA for a supply voltage of 1.8 volts and a data rate of 1 kbit/s.

In order to achieve such an energy efficiency, a microprocessor and different operating modes are dispensed with in the wireless wake-up receiver. The wireless wake-up receiver is preferably an integrated electronic circuit (integrated circuit) which has a reaction time of less than 30 ms for a data rate of 1 kbit/s and a sensitivity of −80 dBm. It is furthermore designed to be operated in the licence-free ISM frequency bands 433 MHz, 868 MHz and 2.4 GHz.

The wireless wake-up receiver monitors the wireless channel continuously and scans the wireless channel with regards to the occurrence of the wake-up signal. The wake-up signal is defined by a signal pattern which is known to the wireless wake-up receiver.

By way of example, reference is made in connection with such a wireless wake-up receiver to a product of the Fraunhofer Institute for Integrated Circuits ITS, which is advertised under the brand name RFicient®.

A shelf label client that is used in the shelf label system may have different designs and therefore provide various functionalities.

Thus, the shelf label client can be equipped, configured or correspondingly designed, e.g. for detecting environmental parameters, such as e.g. for temperature or even moisture detection, or as an input element or sensor for detecting an input interaction of a user (e.g. for detecting a fingerprint, a key press or else for detecting a touch of a touchscreen) or else as a display medium for the presentation of information for the user, namely as a shelf label display, particularly with an extremely energy-saving screen.

The extremely energy-saving screen can be realized e.g. by an LCD screen. In particular, however, the technology that is used is based on electronic ink or electronic paper technology. A display unit of this type therefore has a reflective screen, also termed electronic paper display, abbreviated EPD, in technical jargon, and is realized with the aid of "electronic paper", abbreviated to "e-paper" or "e-ink". These terms substantially stand for the principle of an electrophoretic display which contains e.g. positively charged white particles and negatively charged black particles in a transparent, viscous polymer. By briefly applying a voltage at electrodes, between which the medium made up of particles and polymer is arranged, either the black particles are placed in front of the white particles or vice versa in the viewing direction. This arrangement is then maintained for a relatively long time (e.g. a few weeks) without further energy supply. If the display is segmented accordingly, e.g. letters, numbers or images can be realized with relatively high resolution in order to display said information. Such a reflective screen can however also be realized with the aid of other technologies, which are known e.g. under the term "electrowetting" or "MEMS". The screen can be designed e.g. as mentioned for black and white display, for greyscale display, for black, white and red display or else for black, white and yellow display. Future developments, which enable a full-colour or even multi-colour display, should also be included. Such a screen is very generally a reflective, that is to say passive, non-self-illuminating display, in which the—relatively static—information display is based on light generated by an external (artificial or natural) light source shining onto the screen and being reflected from there to the observer.

In each case, a shelf label client of this type is designed in such a manner that it can be attached to a shelf edge strip. The shelf label client has its own battery or a rechargeable battery as energy supply, wherein this energy supply can be rechargeable or else only replaceable.

The shelf label client can however also be designed as an electronic supply device, which is installed on the said shelf edge strip and is there used for the electrical supply of battery-free shelf labels, which are likewise fastened to the said shelf edge strip. These shelf labels can also have the previously mentioned functionalities, but these functionalities (with the exception of the visualization of information using an extremely energy-saving screen) are only available during the energy supply of the shelf labels by the supply device. The supply device can be designed for contactlessly supplying energy and communication to the shelf labels of a shelf edge strip. For their part, the shelf labels have a corresponding design. Preferably, the supply takes place by means of inductive coupling of a conductor loop of the shelf label with a conductor loop of the shelf edge strip, which is electrically conductively connected to the supply device. Particularly preferably, the shelf labels and the supply device have an RFID or NFC interface for this purpose. RFID stands for Radio Frequency Identification and an applicable standard is e.g. ISO/IEC/18000. Here, NFC stands for Near Field Communication, and the applicable standards are e.g. ISO/IEC 13157, -16353, -22536, -28361, etc.

The use of said technologies in particular allows the shelf label to be realized in particular as a shelf label display without its own energy supply such as a battery or a rechargeable battery for example, which are both relatively expensive. For the purposes of maintenance or replacement of the battery or rechargeable battery, a conventional shelf label must also be designed such that said energy storage devices are replaceable. Where necessary, only a capacitor for short-term, temporary smoothing or stabilization of the internal supply voltage is still used in the shelf label used here. The shelf label is therefore designed such that its electronics for communication or for updating the screen content or for receiving user interaction or for detecting environmental parameters, in particular its electronic control, is only active when it is supplied with the aid of the external electronic supply device. The housing can be completely and permanently encapsulated, because it is no longer necessary to replace the energy storage device, and therefore it can only be opened for recycling purposes (e.g. with a special tool).

The shelf label can therefore be reduced to few (electronic) components that are absolutely necessary and therefore can also be produced as an extremely inexpensive shelf label. This extremely reduced shelf label only needs still to have a basic functionality, such as e.g. standardized NFC communication with standardized energy supply during the NFC communication, which is realized with the aid of a commercially available NFC module. Updates of the screen of the energy-saving display unit and the associated status reports thereof are not dealt with directly by the shelf label display in a communication with an access point, as is the case for known systems, but rather is handled by the interposed supply device, which for its part is in contact with the access point via a suitable (and essentially freely chooseable) communication method, which is also covered in detail in the following. The same applies analogously for the other possible functionalities of the shelf label that are mentioned.

Furthermore, the shelf edge strip can have at least one conductor loop constructed on it, both line ends of which, termed loop connectors in the following, are electrically conductively connected to the NFC interface of the supply device. The conductor loop is provided to transmit the energy for the electrical supply of a shelf label, which is mounted on the shelf edge strip corresponding to the conductor loop, contactlessly to the shelf label with the aid of the conductor loop. Here, "contactless" means that this takes place with the aid of an inductive coupling between two adjacently located conductor loops or coils. Thus, the shelf label may also have a conductor loop consisting of a single loop or a multiplicity of windings, that is to say a coil, as constituent of its NFC interface. Furthermore, "corresponding to" means that the shelf label is positioned adjacent to the area spanned by the conductor loop and is located there essentially inside a zone delimited by the conductor loop. The conductor loop itself may be designed to be e.g. visible in the plane of the shelf edge strip or covered by a protective material strip. If the shelf label is inserted into the shelf edge strip, then the conductor loop or coil installed into the shelf label is automatically located in the zone that can be used for the inductive coupling between the two adjacently positioned conductor loops or coils. Preferably, in the shelf label inserted into the shelf edge strip, the areas spanned by the two conductor loops or coils (on one side belonging to the shelf edge strip and on the other side belonging to the shelf label) are orientated parallel to one another and located at a spacing of less than one millimetre up to a few millimetres. So as not to impede the inductive coupling, the shelf edge strip itself is preferably manufactured from plastic.

The perimeter of the conductor loop may for example extend along the entire length of the shelf edge strip and the entire height of the shelf edge strip. Preferably, the area spanned by the conductor loop will however be somewhat smaller than the area of its front side defined by the physical dimensions of the shelf edge strip. The at least one conductor loop can be located inside the channel of the shelf edge strip, into which the shelf labels are inserted, and integrated into the wall of the channel there, which in the case of the inserted shelf label runs correspondingly (adjacently) to the rear wall thereof. To realize the conductor loop, a single conductor track running round or a conductor track running around multiple times in a coil-like manner, that is, having multiple windings, can be provided. The conductor loop has a loop connector at each of its two ends, to which the integrated electronic circuit of the NEC interface is connected. The conductor loop may however also be located on the rear side of the shelf edge strip.

The shelf edge strip may be equipped with a single conductor loop. It has proven advantageous however, if a plurality of conductor loops is constructed along the longitudinal extent of the shelf edge strip, each of which is for itself coupled with the integrated electronic circuit of the NFC interface (as mentioned). In this configuration, the NEC interface can be used for selective energy transmission with the aid of each of the conductor loops. This enables the optional energy supply for a single shelf label or a group of shelf labels. Depending on the implementation, 2, 3 or up to 15 or even considerably more conductor loops can be realized along the shelf edge strip for example. These conductor loops are positioned next to one another along the longitudinal extent of the shelf edge strip and their in each case two loop connectors are guided along the shelf edge strip to the supply device and there electrically conductively connected to the same. The longitudinal extent of the zone covered by the respective conductor loop at the shelf edge strip may be identical for all conductor loops. Thus, along the shelf edge strip, many zones may be defined located close together, the respective longitudinal extent of which is orientated to the longitudinal extent of the shelf label that is used on the shelf edge strip, wherein the longitudinal extent is usually a few cm, such as e.g. 8-12 cm. This allows the individual (selective) inductive coupling with each individual shelf label at (almost) any desired positions along the shelf edge strip. This is advantageous if the positioning of the shelf label should take place as flexibly as possible and in spite of that an inductive coupling, which is as individual as possible, should be possible with each shelf label. However, larger zones may also be provided, in which a plurality of shelf labels can then be located, which can then form an inductive coupling together with the relevant conductor loop. This configuration can be used if the exact position of the respective shelf label does not come into consideration. Such a case results, if e.g. a plurality of identical products are placed on a shelving unit over a relatively long section or the entire length of the shelving unit and always the same information for these products is presented by a plurality of shelf label displays placed at relatively large distances from one another along the longitudinal extent of the shelf edge strip. However, mixed configurations of relatively short zones and, relative thereto, also relatively long zones may also be present along the shelf edge strip.

The conductor loops may all be used together, that is to say simultaneously, for energy transmission by the supply device. However, this means a correspondingly complex design for the electronics of the supply device. Therefore, it has proven particularly advantageous if the supply unit is designed for multiplexing the energy transmission via the conductor loops. In this case, it is always only one single conductor loop, which is selected electronically, that is used for energy transmission.

The at least one conductor loop is therefore a constituent of the NFC interface of the supply device that is intended for contactless energy transmission (as well as for contactless communication).

Quite generally, it is to be determined here, that the conductor loop therefore realizes an inductor, which is used for inductive coupling with the corresponding inductor on the side of the shelf label. The conductor loop can otherwise have a single winding or even a plurality of windings.

Furthermore, the at least one conductor loop can be integrated into the shelf edge strip or fastened on the same. The integration into the shelf edge strip is advantageous if the shelf edge strip is for example manufactured from plastic and the conductor loop is integrated there as soon as during e.g. injection moulding, that is to say during the manufacture of the shelf edge strip. The conductor loop can however also be fastened on the surface of the shelf edge strip, e.g. by means of adhesive bonding. Particularly if many conductor loops, which are arranged next to one another, are required and also correspondingly many supply lines are to be considered, it has proven advantageous if the conductor loop(s) is (are) constructed on a printed circuit board. This printed circuit board can then be integrated as a separate component into the shelf edge strip or fastened on the same. Also, the shelf edge strip can be constructed in such a manner that the printed circuit board can be replaced, so that it is possible to easily react to a wide range of different requirement profiles in shelf planning with very different conductor loop configurations, which can be realized e.g. on a single printed circuit board or on different printed circuit boards. Particularly preferably however, the shelf edge strip itself has a conductor loop mount. This may be constructed in such a manner that it is located e.g. on the front side of the shelf edge strip, that is to say where the rear side of the shelf label is as close as possible to the shelf edge strip in the state where the shelf label is fastened on the shelf edge strip. The conductor loop mount can however also run on the rear side of the shelf edge strip, corresponding to the region of the shelf edge strip where the shelf label can be attached, which may entail a better accessibility of the conductor loop for maintenance purposes or else ensures an unparalleled protection from damage. Finally, there, the conductor loop is also hidden from the view of the customers of a supermarket. Structurally, the conductor loop mount can be realized e.g. by a gap-like depression in the e.g. plastic material of the shelf edge strip, into which depression the conductor loop is inserted. Thus, the shape of the conductor loop as well as the exact positioning thereof can also be defined as precisely as possible without further measures (such as e.g. the previously mentioned printed circuit board and the positioning thereof). Also, the conductor loop positioned on the rear side can be electrically conductively connected at practically any desired point to electronics of the supply device, without consideration having to be given to the position of the shelf labels positioned on the front side of the shelf edge strip. The depression may also have a snap or fixing mechanism, which fixes the conductor loop in its intended position. Also the depression may be constructed in such a manner that it can accommodate a plurality of windings of the conductor loop, wherein these can be arranged next to one another and/or above one another in the depression.

Also, one is not bound by the limits of the production process for printed circuit boards during the integration of a conductor loop mount directly into the shelf edge strip (that is into the material thereof) during the planning or production of the conductor loop and can therefore also realize conductor loops with a length which far exceeds those for current printed circuit boards of approx. one metre. It is therefore absolutely possible to realize conductor loop which extends along an entire shelf edge strip, which may be several metres long.

It has proven particularly advantageous if exactly one single electronic supply device is used per shelf edge strip. This makes it possible to realize a focused energy supply only for this one shelf edge strip.

In this context, it has furthermore proven particularly advantageous if the electronic supply device is integrated into the shelf edge strip or is fastened on the same. Thus, a shelf edge strip with individual electronic energy supply can be realized. In this case, the supply device can e.g. also be constructed directly on the printed circuit board or connected to the same as a module or mechanically coupled to the shelf edge strip as a module and electrically conductively connected to the conductor loop of the shelf edge strip. As a result, the shelf edge strip as a whole, including its supply device, can be taken out and recommissioned at a different location without problem.

Particularly preferably, the access point is designed for transmitting data content to the wireless wake-up transmitter, wherein the data content is used for addressing a wireless wake-up receiver or a group of wireless wake-up receivers, and wherein the wireless wake-up transmitter is designed to send the data content in the wake-up signal or in addition to or delayed with respect to the wake-up signal, and wherein the wireless wake-up receiver of the at least one shelf label client is designed for detecting the data content and for checking whether it is addressed by the data content.

The data content is preferably sent after the sending of the wake-up signal in the same frequency band and on the same channel there.

The wireless wake-up receiver which has detected the wake-up signal subsequently attempts to receive the data content. If this is not successful, it listens again for a new occurrence of the wake-up signal.

If the wireless wake-up receiver detects data content (e.g. in a short time window after the occurrence of the wake-up signal), it checks whether this data content is identical to an identification (digital number), which identifies it uniquely and which is saved in it. If this identity is also established, an addressing of the wireless wake-up receiver is present and the wireless wake-up receiver initiates the change from the sleep mode to the active mode. If the identity is not established, no addressing of the wireless wake-up receiver is present and the wireless wake-up receiver remains in the ready-to-receive state for the next occurrence of the wake-up signal.

This measure is associated with the advantage that only one shelf label client selected by addressing of its wireless wake-up transmitter changes from its energy-saving sleep mode to its active mode, in order to take part in wireless communication with the access point. Thus, it can be ensured that an unchecked high number of the shelf label clients does not attempt to create a connection set-up. Due to the selective initialization of the connection set-up for only certain shelf label clients that are predefined by the access point, an optimum system performance, such as data throughput rate and/or reaction speed, of the wireless network is ensured, which would not typically be the case for an arbitrary connection set-up scenario. According to this measure, individual shelf label clients or else groups of shelf label clients, which belong together for processing or thematic reasons, are activated. For example, this may be all shelf label clients which are shelf labels of a shelving unit or a shelf edge strip, in order to use their functionalities (e.g. display, temperature sensor, touch sensor, etc.). This may also be those shelf label clients which form supply devices of a shelf edge strip, in order to use the functionalities of the shelf labels supplied with the aid of the supply device available there (e.g. display, temperature sensor, touch sensor, etc.).

The addressing of individual wireless wake-up receivers can here take place individually on the basis of an individual number that is saved in them and uniquely identifies them.

For addressing, in each case a pair of wake-up signal and addressing data content can be sent so often until all wireless wake-up receivers of the group have been addressed.

The addressing may however also take place such that following the sending of the wake-up signal, a number of the data contents corresponding to the group size is sent as individual addresses until all wireless wake-up receivers of the group are addressed.

The addressing may however also take place such that a group of wireless wake-up receivers were previously programmed with one and the same number and then when only one single number is sent as the data content by the access point, the group of wireless wake-up receivers is addressed directly as a group.

Particularly preferably, such a group comprises a number of 2 to 20, preferably 5 to 10 wireless wake-up receivers. In the definition of the maximum number of group participants which are simultaneously involved in a wireless communication with the access point, the access point itself takes account of how many group participants it can sensibly permit in terms of wireless technology, that is to say without allowing a significant loss of its system performance to occur. The access point can in this case also differentiate between highly prioritized and low prioritized wireless activities and correspondingly adapt the group size dynamically. Typically, in the case of a WLAN communication, ideally a maximum of 10 shelf label clients are in active mode and take part in wireless communication according to the WLAN standard with the access point, which has selected them by addressing the wireless wake-up transmitter respectively installed there.

It has proven particularly advantageous if the access point is designed for addressing one group of the wireless wake-up receivers in successive time intervals in each case. In particular, this measure makes it possible for an access point to operate a virtually arbitrary number of shelf label clients over time, because per time interval, only ever a limited number (which is as small as possible) of the shelf label clients in the active mode participates in the communication with the access point according to the wireless standard. By adapting the number of the active shelf label clients in the respective time interval, it is possible optimally to address the performance available at the access point during communication according to the wireless standard. Thus, a single access point can acquire the capability to wirelessly operate an extremely high total number of shelf label clients (e.g. 5,000-10,000 units, given a satisfactory wireless range of the access point) over a time period of e.g. 24 hours, wherein it is in fact always only a relatively small selected group (e.g. 10 units) of the shelf label clients that is operated wirelessly) per time interval. If e.g. 60 seconds are available for wireless traffic with 10 shelf label clients per time interval, up to 14,400 shelf label clients can be supplied by a single (e.g. WLAN) access point over an entire day. This value is not only computationally, but rather also practically relevant, because in the communication according to the wireless standard, usually only a very small quantity of data arises for each shelf label client, which is transmitted or exchanged with the access point in a few seconds.

Due to the measure of dividing the wireless communication with the totality of the shelf label clients into individual time intervals, in which communication only takes place with a very small group of the shelf label clients according to the wireless standard, an inherent disadvantage of known access points—namely only being able to operate a relatively small number of shelf label clients at the same time in the context of a wireless communication according to a wireless standard—is overcome or in fact used in an advantageous manner. This measure is also associated with the advantage that the number of access points necessary in a business premises can be reduced dramatically, which also leads to a simpler and ultimately less expensive wireless infrastructure.

The measures according to the invention can be used in connection with the wireless standards ZigBee or Bluetooth for example. The measures according to the invention have proven particularly effective however if a WLAN standard is used as wireless standard. Here (as in principle also in the case of the two other previously mentioned standards), by means of small changes to the technical design of the access point, namely the accommodation of the wireless wake-up transmitter and also the functional capability of the individual or group-based addressing of the wireless wake-up receivers installed in the shelf label clients, an extremely efficient wireless network can be realized, the performance characteristics of which (such as e.g. the maximum number of clients allowed, data throughput, etc.) far exceed conventional solutions. Such an access point, which is modified according to the invention, can also dispense with separate wireless wake-up transmitters, specifically if the access point wireless module is used for sending the wake-up signal and the data content, which otherwise is only used for wireless communication according to the wireless standard.

Also, on the side of the shelf label client, the technical measures for realizing the invention have a scope that can be easily comprehended. Thus, it is for example sufficient that the wireless wake-up receiver is designed to generate an activation signal when addressing is detected and to output the same to a client wireless module of the shelf label client, which is designed for wireless communication according to the wireless standard, wherein the client wireless module is designed for receiving the activation signal and, as a consequence of the occurrence of the activation signal, to adopt its active mode, in which initially a wireless connection set-up and subsequently a wireless communication with the access point is carried out according to the wireless standard.

Such an activation signal may for example be an interrupt signal, which is supplied to an interrupt input of the electronics of the client wireless module (e.g. a microcontroller of the client wireless module, which may also be responsible for other functionalities of the shelf label client) and triggers an interrupt at the client wireless module, so that the wireless module with its entire functionality starts up from the sleep mode into the active mode. In the active mode, the client wireless module runs through a connection set-up and after the connection set-up with the access point is available for wireless communication according to the wireless standard. After dealing with all content aspects which fall within the scope of wireless communication (e.g. update of the screen, querying a status, receiving an input, detecting and transmitting a sensor signal, etc.), the client wireless module can be transferred back into the sleep mode, e.g. after a communication-free time period has elapsed or due to the receipt of a command terminating the wireless communication, which is transmitted by the access point in the context of the wireless communication according to the wireless standard, or automatically towards the end of the time interval, about the length of which the shelf label client is informed (e.g. by programming).

In summary, the measures described allow an access point which is designed for communication with the shelf label clients according to a wireless standard, such as e.g. Bluetooth, ZigBee or particularly preferably WLAN (particularly WiFi), wakes up a relatively small group of the shelf label clients one after the other in a continuous sequence with the aid of the addressing wake-up signal and handles the communication according to the wireless standard with the active group of the shelf label clients. Thus, a virtually arbitrarily sized number (up to ten or even thirty thousand) of the shelf label clients can be supplied via wireless technology using a single access point, which is actually only designed for the simultaneous wireless supply of the relatively small number of shelf label clients that are active in the respective group or cannot supply more clients simultaneously owing to the wireless standard that is used.

The electronics of the various devices of the system, just like also the interface etc. thereof can be realized with the aid of a very wide range of passive and also active electronic components in a discrete and also integrated manner. Preferably, a microprocessor with corresponding peripheral components or a microcontroller, upon which a software for providing the various functionalities is executed, is used in this case. Also, what are known as ASICs (Application-Specific Integrated Circuits) can be used.

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures.

DESCRIPTION OF THE EXEMPLARY EMBODIMENTS

Figure 1:
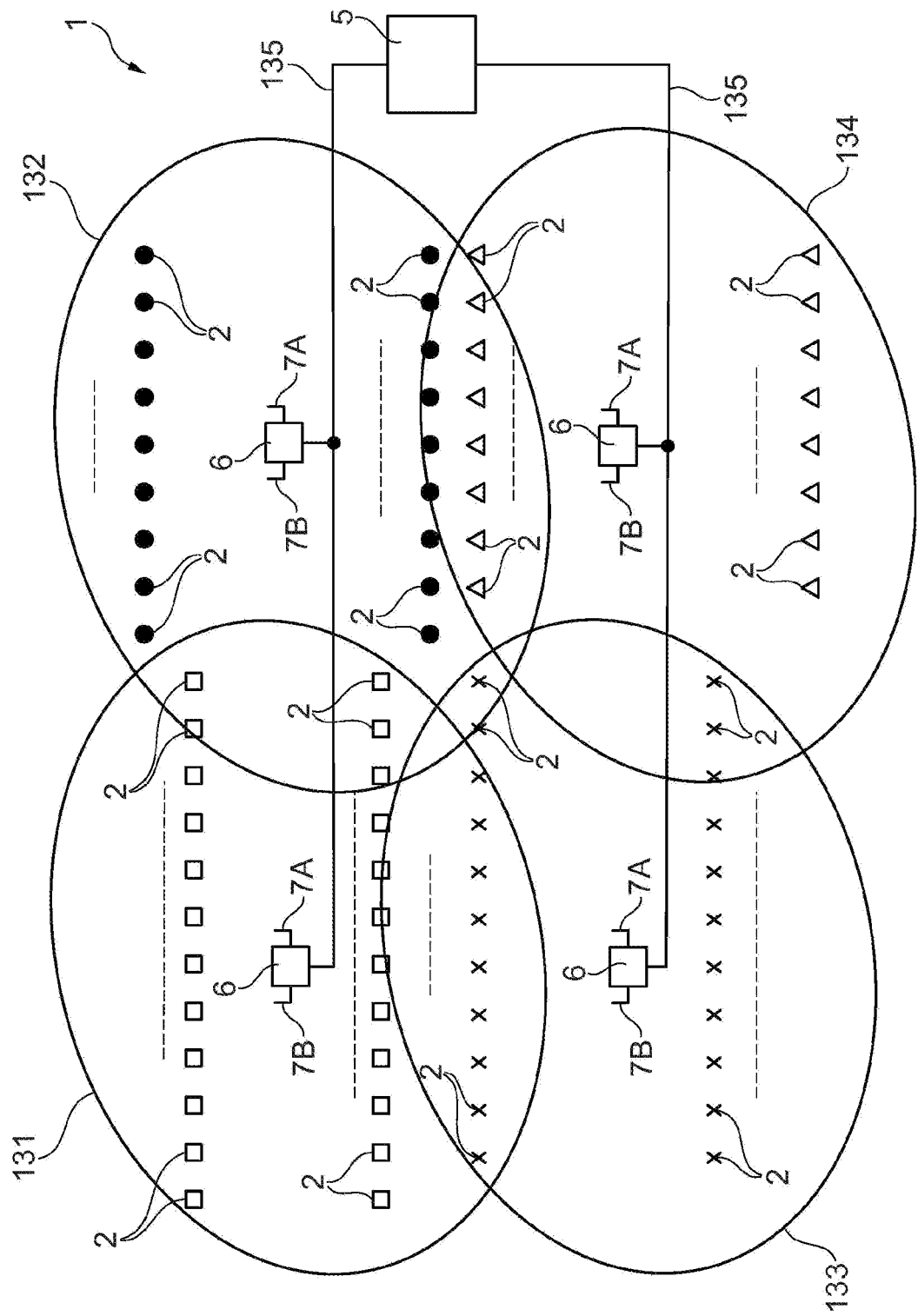
FIG. 1 schematically shows a shelf label system.

An electronic shelf label system 1, which is shortened to system 1 in the following, is illustrated in FIG. 1. The system 1 has 4000 shelf label clients 2, shortened to clients 2 in the following, and four access points 6. Each access point 6 has an individual wireless coverage zone 131-134, wherein the four wireless coverage zones 131-134 overlap in some regions. The access points 6 and also the clients 2 are WLAN-enabled according to the standard specification IEEE 802.11b/g/n. The access points 6 use the 2.4 GHz ISM radio band for their wireless communication, wherein ISM radio band here stands for "Industrial, Scientific and Medical radio band" and each of the access points 6 uses a different wireless channel. Inside the first wireless coverage zone 131, the 1000-unit clients 2 are symbolized with a square and assigned to the first access point 6 visualized at the centre of the first wireless coverage zone 131 via a first wireless channel. Inside the second wireless coverage zone 132, the 1000-unit clients 2 are symbolized with a circle and assigned to the second access point 6 visualized at the centre of the second wireless coverage zone 132 via a second wireless channel. Inside the third wireless coverage zone 133, the 1000-unit clients 2 are symbolized with a cross and assigned to the third access point 6 visualized at the centre of the third wireless coverage zone 133 via a third wireless channel. Inside the fourth wireless coverage zone 134, the 1000-unit clients 2 are symbolized with a triangle and assigned to the fourth access point 6 visualized at the centre of the fourth wireless coverage zone 134 via a fourth wireless channel. In the present case, geographically only the outermost of the respective clients 2 are visualized for each wireless coverage zone 131 to 134, so as to not overload the FIG. 1. Actually, it is assumed in the present case that the remaining non-visualized clients 2—which increase the visualized clients 2 to the total number of 1000 units per wireless coverage zone 131 to 134—are located between these outermost clients 2. However, it is also noted at this point that each wireless coverage zone may also have an individual number of clients 2.

The access points 6 are fastened to the ceiling in a business premises (not illustrated) of a retailer or supermarket, typically with sufficient space from one another, in order to realize the wireless coverage zones 131-134.

Figure 10:
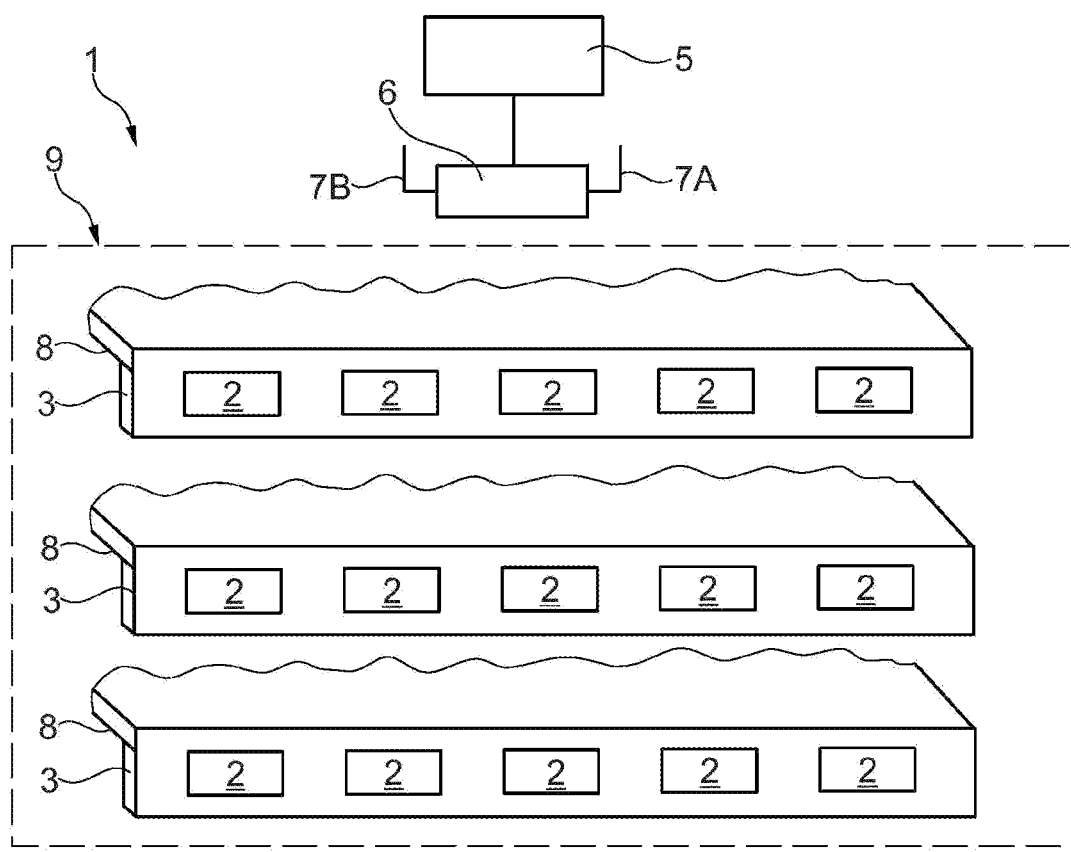
FIG. 10 schematically shows a system part with system components according to the FIGS. 2-3.

As can be seen in FIG. 10, the clients 2 are attached to shelving units 9, strictly speaking to shelf edge strips 3, which form the front end of shelves 8. The clients 2 attached there are used for displaying product and/or price information for products (not illustrated) presented on the shelves 8.

It can furthermore be seen in FIG. 1 that the four access points 6 are connected to a server 5 via Ethernet cables 135. The server 5 is informed of the logical link between the products and the clients 2 and saves this in its database, where the said product and/or price information for each product is also saved. In addition, the server 5 knows the association between the clients 2 and the access points 6 and can therefore transmit the relevant product and/or price information to the respective client 2 with pinpoint accuracy.

In the following, details of an embodiment of the access point 6 and the clients 2, that is to say of system components of the system 1, are discussed with the aid of FIGS. 2 and 3.

Figure 2:
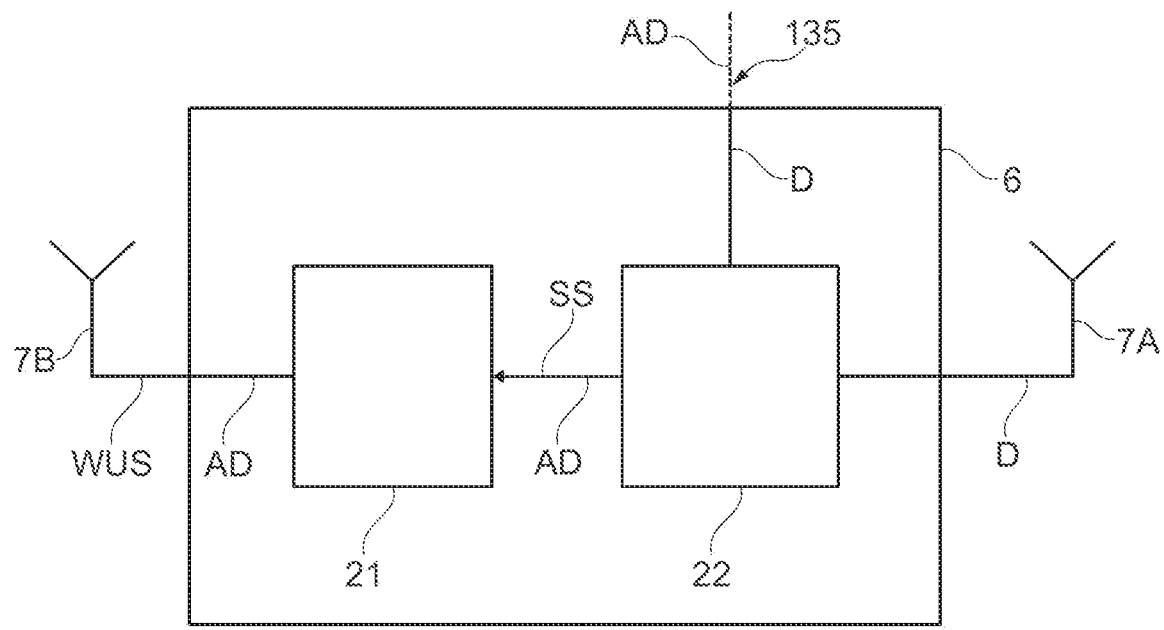
FIG. 2-3 schematically show system components of the system according to a first exemplary embodiment.

An approximate block diagram of the access points 6 is visualized in FIG. 2. This shows a WLAN-enabled access point wireless module 22, which is connected to a first antenna configuration 7A, and is connected to a wireless wake-up transmitter 21, which is connected to a second antenna configuration 7B. The wireless wake-up transmitter 21 is designed to receive a send control signal SS from the WLAN wireless modules 22 and subsequently to send a wake-up signal WUS via the second antenna configuration 7B. The access point 6 is operated using a separate power supply unit (not illustrated) or supplied with power via the Ethernet cables 135, which is known under the term "power over Ethernet".

Figure 3:
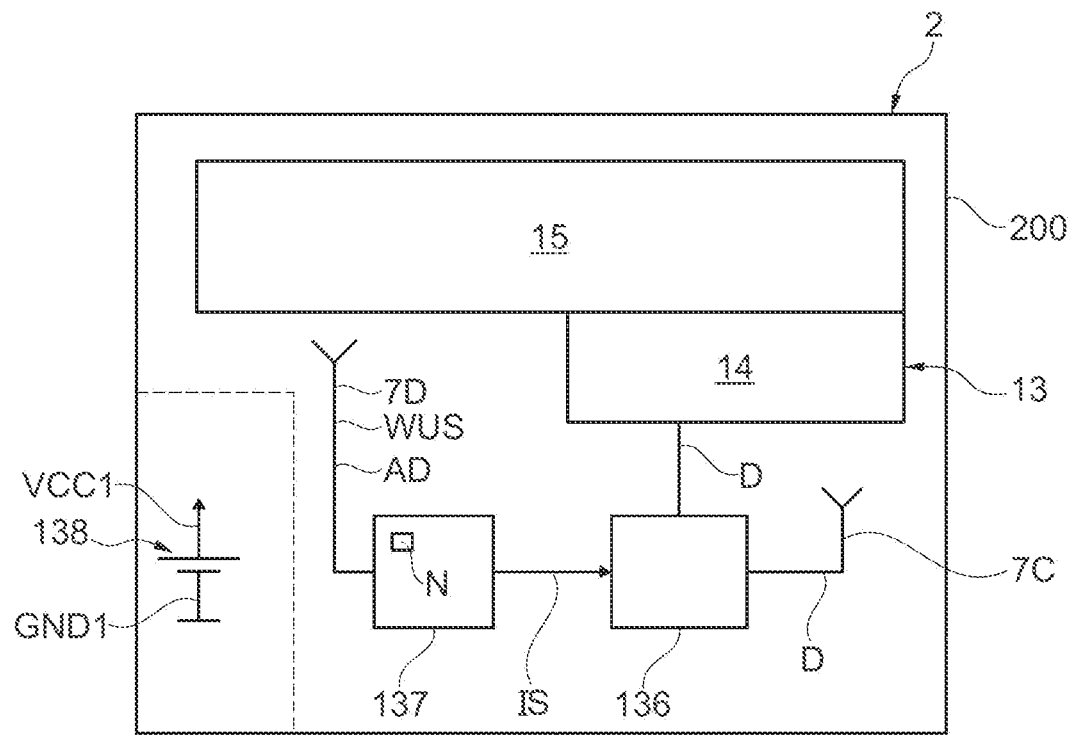

A block diagram of the clients 2, which are realized by shelf label displays 200, is visualized in FIG. 3. Each client 2 has a display unit 13, which is broken down into a screen controller, realized as an electronic paper display controller 14, and a screen, which is connected to the same and can be controlled using the same, realized as an electronic paper display screen 15. Furthermore, the client 2 has a WLAN-enabled client wireless module 136, which is connected to a third antenna configuration 70. Data D are received from the access point 6 via the client wireless module 136 and interpreted with the aid of the controller 14 and, if appropriate, the image contents of the screen 15 are changed accordingly by the controller 14. Likewise, the data D may represent status information of the client 2, which are output to the access point 6 via the client wireless module 136.

The client 2 has an energy-saving sleep mode without wireless communication readiness according to a WLAN wireless standard and an active mode with wireless communication readiness according to the WLAN wireless standard.

The client 2 furthermore has a wireless wake-up receiver 137, which gets by with a relatively small, but essentially constant current requirement of typically less than 3 µA and is permanently operating, that is to say is ready-to-receive for receiving the wake-up signal WUS during the active mode and also during the sleep mode. The wireless wake-up receiver 137 scans a preset wireless channel in a preset frequency band for this purpose and checks its received signal for the presence of a preset signal sequence or signal structure which characterizes the wake-up signal WUS, wherein the wireless wake-up transmitter 21 also has these presets. In the client 2, all components with the exception of the wireless wake-up receiver 137 are switched off or stopped during the sleep mode.

Furthermore, each client 2 saves, in a digital manner, a number N that uniquely identifies it and with the aid of which it can also be addressed uniquely. This number N may be predetermined in an immutable manner or else may be programmable by the server 5.

The client 2 furthermore has a replaceable battery 138, which delivers a first supply voltage VCC1 relative to a first reference potential GND1 for supplying power to the client 2.

The wireless wake-up receiver 137 is designed to receive the wake-up signal WUS and to detect it. As soon as the wireless wake-up receiver 137 detects the wake-up signal WUS, it checks whether address data AD are subsequently received, which correspond to the number N saved in it. Only if these match, that is to say the circumstance that it is addressed is established, does the wireless wake-up receiver 137 output an interrupt signal IS to the client wireless module 136, so that the same starts its operation and as a consequence initiates a wireless connection set-up with the access point 6 according to the WLAN wireless standard mentioned.

The server 5 is the instance in the system 1 which is also informed of the number N of the wireless wake-up receiver 137 installed in the respective client 2. The server 5 therefore knows the relationship between the respective wireless wake-up receiver 137 and the respective client 2 and saves this relationship in its database in addition to the link between product, client 2 and position of the client 2 in the business premises. In principle, even the individual number N of the respective wireless wake-up receiver 137 alone can uniquely identify the respective client 2.

It is mentioned at this point however that each client 2 as such or else the respective client wireless module 136 installed there can save a separate additional number suitable for unique identification, such as e.g. a MAC address (Media Access Control address).

The wireless wake-up transmitter 21 of the respective access point 6 is therefore supplied from the server 5 via the Ethernet cables 135 with the address data AD to be transmitted after sending the wake-up signal WUS. In this case, a communication request is transmitted from the server 5 to the access point wireless module 22, in which communication request the address data AD and the data D to be transmitted are contained. As soon as the access point wireless module 22 is ready for connection set-up with the client 2 addressed according to the address data AD, the send control signal SS together with the address data AD is output to the wireless wake-up transmitter 21 and the wireless wake-up transmitter 21 sends the wake-up signal WUS and, subsequently to that, the address data AD. Only the client 2 which receives the wake-up signal WUS and detects the addressing thereof with the aid of the address data AD received thereafter starts the wireless communication readiness of the client wireless module 136 of the client 2, in which it is installed, as discussed previously.

The mode of operation of the system 1 is discussed in the following with the aid of FIG. 10. For a simplified overview of the mode of operation, only a single access point 6 is illustrated here, which is for example that at the centre of the first wireless coverage zone 131. Consequently, the clients 2 illustrated are those which are visualized as squares inside the first wireless coverage zone 131, wherein of the 1000 units, only 15 units are illustrated in groups of five units each on three shelf edge strips 3 of a single shelving unit 9. Furthermore, it is assumed that an update of all clients 2 of this shelving unit 9, that is to say the 15 units, is necessary at the server 5.

In order to carry out this update process efficiently in the context of the available wireless standard (WLAN), the server 5 splits the update process into three subprocesses, wherein in each case the clients 2 of a shelf end strip 3 are updated together within a time interval. In the present case, according to this update process, initially the clients 2 of the top shelf edge strip 3 should be updated in a first time interval, then the clients 2 of the middle shelf edge strip 3 should be updated in a second time interval and then the clients 2 of the bottom shelf edge strip 3 should be updated in a third time interval. Each of the three time intervals extends over 60 seconds in the present case. The three time intervals are defined as directly following one another sequentially.

For this purpose, initially at the start of the first time interval, the five-unit address data AD of the wireless wake-up receiver 137 installed in the clients 2 of the top shelf edge strip 3 are transmitted from the server 5 to the access point 6. Together with that or following that, the data D to be transmitted to the respective client 2 in a wireless communication according to the WLAN standard are transmitted from the server 5 to the access point 6 and saved. The access point wireless module 22 is therefore ready for the WLAN communication with the five clients 2 of the top shelf edge strip 3 and starts the activity of the wireless wake-up transmitter 21 using the send control signal SS, with which the five-unit address data AD are also transferred to the wireless wake-up transmitter 21.

After that, the wireless wake-up transmitter 21 sends first the wake-up signal WUS and then the address data AD of the respective wireless wake-up receiver 137 five times successively in pairs, in accordance with the number of address data AD transmitted (this is five units in the present case), until all five wireless wake-up receiver 137 units are addressed.

In the respective wireless wake-up receiver 137, first the wake-up signal WUS is detected and then it is established that the wake-up signal WUS is followed by address data AD that address the respective wireless wake-up receiver 137. The wireless wake-up receivers 137 installed in the clients 2 of the top shelf edge strip 3 detect on the basis of the address data AD, that they are addressed and activate the respective client wireless module 136 using the respective interrupt signal IS, which starts its operation and sets up a wireless connection with the access point 6, in order as a consequence to receive the data D intended for the respective client 2 in the course of a wireless communication according to the WLAN standard and to process the same in the respective client 2.

Although the wireless wake-up receivers 137 installed in the clients 2 of the middle and bottom shelf edge strips 3 receive the wake-up signal WUS, they detect on the basis of the address data AD that they are not addressed and consequently do not set any further activity.

Towards the end of the first time interval, the WLAN wireless connections between the access point 6 and the five clients 2 of the top shelf edge strip 3 are ended, which can take place e.g. by sending a status notification by the respective client 2 and/or by a termination command sent by the access point 6 or solely because the first time interval runs out, which must of course be known to the relevant client 2 due to a corresponding timing in the respective client 2.

Subsequently, the subprocess described previously in the first time interval for the clients 2 of the top shelf edge strip 3 is run through with adjusted parameters (address data AD and data D) sequentially for the clients 2 installed on the middle shelf edge strip 3 during the second interval and then for the clients installed on the bottom shelf edge strip 3 during the third time interval. This method ensures that per time interval, the group size of clients 2 is limited in such a manner that the WLAN wireless communication is dealt with reliably in the time interval of defined duration, specifically without overloads of the access point 6 occurring, which in an unfavourable scenario may lead to undesired data loss or clients 2 being missed out, that is to say to an incomplete communication scenario.

In the following, the wireless system components of the system 1 are discussed according to a second exemplary embodiment with the aid of FIGS. 4-6.

Figure 4:
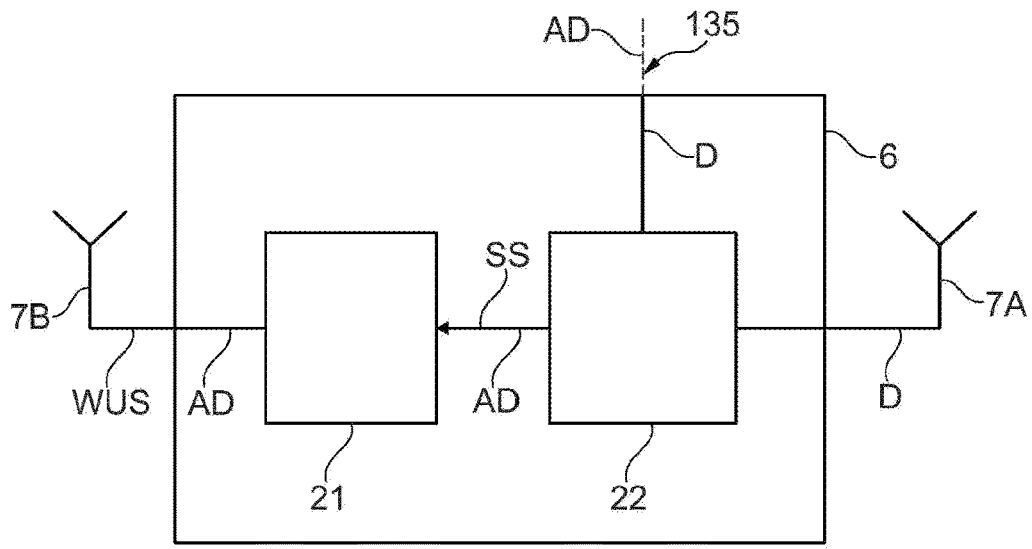
FIG. 4-6 schematically show system components of the system according to a second exemplary embodiment.

In this case, FIG. 4 shows the access point 6, which has remained unchanged compared to the first exemplary embodiment of the system 1.

Figure 5:
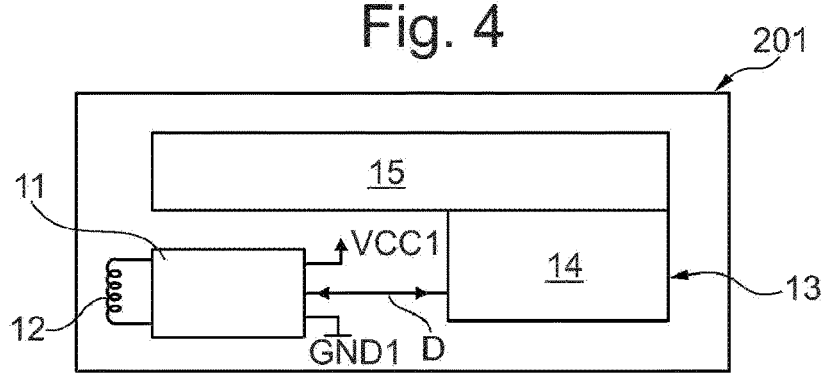

A block diagram of an NFC-enabled shelf label display 201 is illustrated in FIG. 5, wherein NFC stands for "Near Field Communication". The block diagram shows a first NFC interface 11 with its coupling coil 12. With the aid of the coupling coil 12, an inductive coupling can be established with a different NFC-enabled device, in the present case a supply device 4, which is covered in detail in FIG. 6. Actually, an inductive coupling is established with a conductor loop L constructed on the shelf edge strip 3 here (to this end see FIG. 6 in connection with FIG. 11), if the coupling coil 12 is brought correspondingly close to the conductor loop L, which is the case for the shelf label display 201 attached to the shelf edge strip 3. During the inductive coupling, the first supply voltage VCC1 is generated relative to the first reference potential GND1 with the aid of the first NFC interface 11 for the operation of the entire shelf label display 201, which activates the electronics of the shelf label display 201, so that a contactless bidirectional communication of data D can also be carried out via the first NFC interface 11. A constituent of these electronics is also an NFC controller, which provides the entire NFC functionality, but is not illustrated here in detail, but is integrated in the first NFC interface 11.

As already discussed in connection with FIG. 3, the block diagram also shows the display unit 13 connected to the first NFC interface 11, which breaks down into the screen controller, realized as electronic paper display controller 14, and the screen, which is connected thereto and can be controlled therewith, which is realized as the electronic paper display screen 15. With the aid of the controller 14, the data D received is interpreted, the image contents of the screen 15 is changed accordingly, where necessary, or else status information in the form of data D is output to the supply device 4 via the NEC interface 11.

A block diagram of the mentioned shelf edge strip 3 with integrated conductor loop L, particularly also the supply device 4, is discussed in the following on the basis of FIG. 6. Unlike the system components of the system 1 discussed with the aid of FIGS. 2 to 3, it is no longer the shelf label display 200 depicted in FIG. 3, but rather the supply device 4 illustrated in FIG. 6 that forms the client 2.

The supply device 4 is designed both for its own contactless supply with energy and also for contactlessly supplying the shelf label displays 201 with energy. For its own supply, it has a second (replaceable) battery 139, using which a second supply voltage VCC2 is generated relative to a second reference potential GND2.

Figure 6:
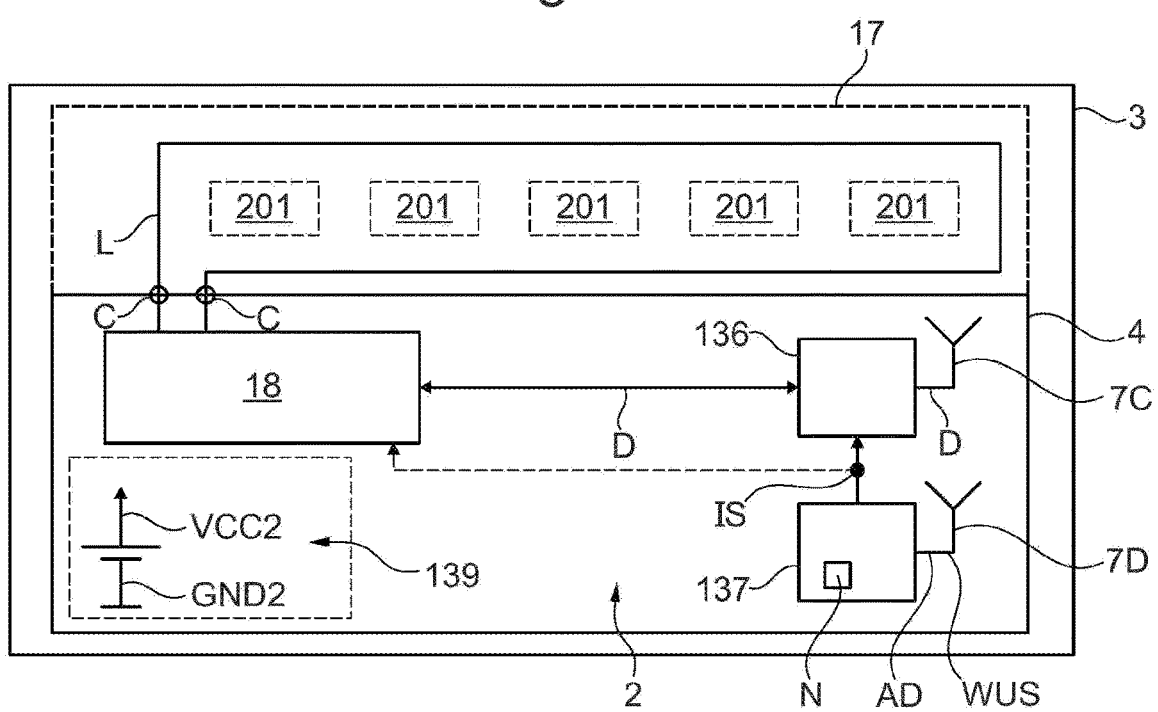

In the visualization of FIG. 6, a support structure 17 is also illustrated and indicated. The support structure 17 supports the conductor loops L, which essentially extend along the entire length of the shelf edge strip 3. The support structure 17 is integrated into the relatively flat structure of the shelf edge strip 3. The supply device 4 electrically conductively contacts the conductor loops L via their loop connectors C.

Corresponding to the position of the conductor loop L or inside the conductor loop L, the shelf label displays 201 respectively positioned there are also illustrated and indicated. Here, the electrical connection of the loop connectors C to the supply device 4 is actually illustrated in particular with the electronics of its (second) NFC interface 18, however. If an inductive coupling with the first NFC interface 11 of the shelf label display 201 is present, the second NFC interface 18 is designed for the contactless transmission of electrical energy to the shelf label display 201 and for bidirectional contactless communication of the data D with the shelf label display 201 activated by energy transmission.

The supply device 4 furthermore has the WLAN-enabled client wireless module 136 known from FIG. 3, which—as discussed—is designed for wireless communication according to the WLAN wireless standard with the access point 6 illustrated in FIG. 4 and which is connected to the third antenna configuration 7C.

The supply device 4 furthermore has the wireless wake-up receiver 137, which is known from FIG. 3, wherein reference is made to the preceding discussions with regards to the function and mode of operation of the components 136 and 137. To avoid lack of clarity, it is noted at this point, that according to this exemplary embodiment, the supply device 4 has the energy-saving sleep mode without wireless communication readiness according to a WLAN wireless standard and the active mode with wireless communication readiness according to the WLAN wireless standard.

In the present case, it is also mentioned that with the aid of the wireless wake-up receiver 137, the NFC interface 18 can also be influenced with regards to the sleep or active mode, which is indicated by a cable with a dashed line for transmitting the interrupt signal IS towards the NFC interface 18. Therefore, the NFC interface 18 is also included by the said sleep mode and active mode. The shelf label displays 201 can otherwise only be supplied with energy in active mode and therefore are themselves only active in this mode.

Figure 11:
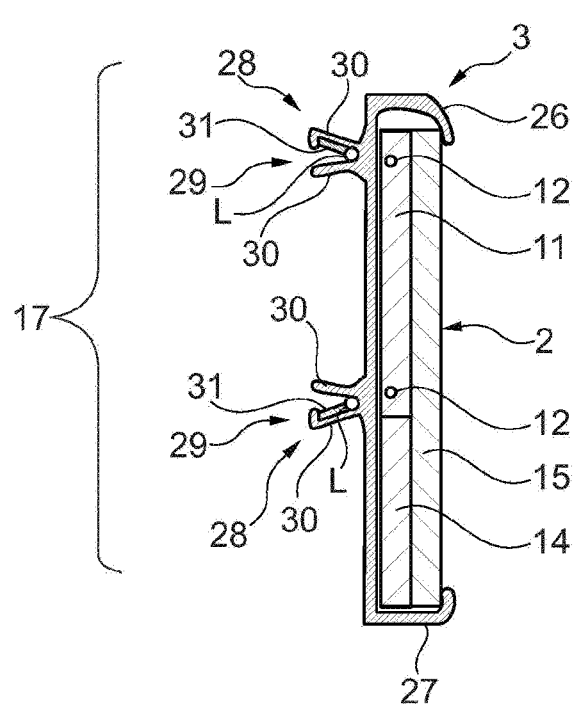
FIG. 11 schematically shows a shelf edge strip with integrated conductor loop.

FIG. 11 shows the shelf edge strip 3 in a cross-sectional illustration, with a support structure 17 having a conductor loop mount 28 on the rear side of the shelf edge strip 3, wherein the conductor loop mount 28 is manufactured directly from the material of the shelf edge strip 3 (from the plastic). The conductor loop mount 28 has a gap-like depression 29, into which a wire of the conductor loop L is inserted in an immovable manner. The gap-like depression 29 is flanked by two walls 30, which are dimensioned in such a manner that with their aid, a snap mechanism is realized, which fixes the wire in its intended position. A band- or strip-like material 31 (material band or strip) is also inserted into the gap-like depression 29 for this purpose, which on the one hand presses the wire of the conductor loop L against the base of the depression 29 and on the other hand supports itself on a lug- or hook-like end of the outer wall 30 in each case or latches there.

However the integration of the conductor loop L into the shelf edge strip 3 or the fastening of the conductor loop L to the shelf edge strip 3 is realized, it has furthermore proven particularly advantageous that the electronic supply device 4 is integrated into the shelf edge strip 3 or is fastened on the same. Thus, a shelf edge strip 3 with individual electronic energy supply can be realized. In this case, the supply device 4 can e.g. also be constructed directly on the support structure 17 or connected to the same as a module or mechanically coupled to the shelf edge strip 3 as a module and electrically conductively connected to the conductor loop L of the shelf edge strip 3. As a result, the shelf edge strip 3 as a whole, including its supply device 4, can be taken out and recommissioned at a different location without problem.

In FIG. 11, the illustration of a fastening mechanism for the shelf edge strip 3, which allows the fastening of the shelf edge strip 3 on a different structure, such as e.g. the shelf 8, was omitted, because this detail does not relate to the invention and can be realized in a wide range of ways that are known to the person skilled in the art.

The shelf edge strip 3 is, just like the shelf label display 200, which realizes the client 2, designed in such a manner that the shelf label display 200 can be inserted into the shelf edge strip 3 from the front and in this case locks with the same by means of a snap mechanism, in such a manner that it can only be removed from the shelf edge strip 3 again with the outlay of considerable force. This can be realized for example with an upper guide strip 26 and a lower guide strip 27 of the shelf edge strip 3, wherein at least one of the two guide strips 26 or 27, where necessary also both, can be bent slightly during insertion or removal of the shelf label display 200. At the same time, the mechanism mentioned allows the shelf label display 200 to be displaced along the shelf edge strip 3 with only comparatively little force outlay and consequently placed easily at any desired position.

Figure 12:
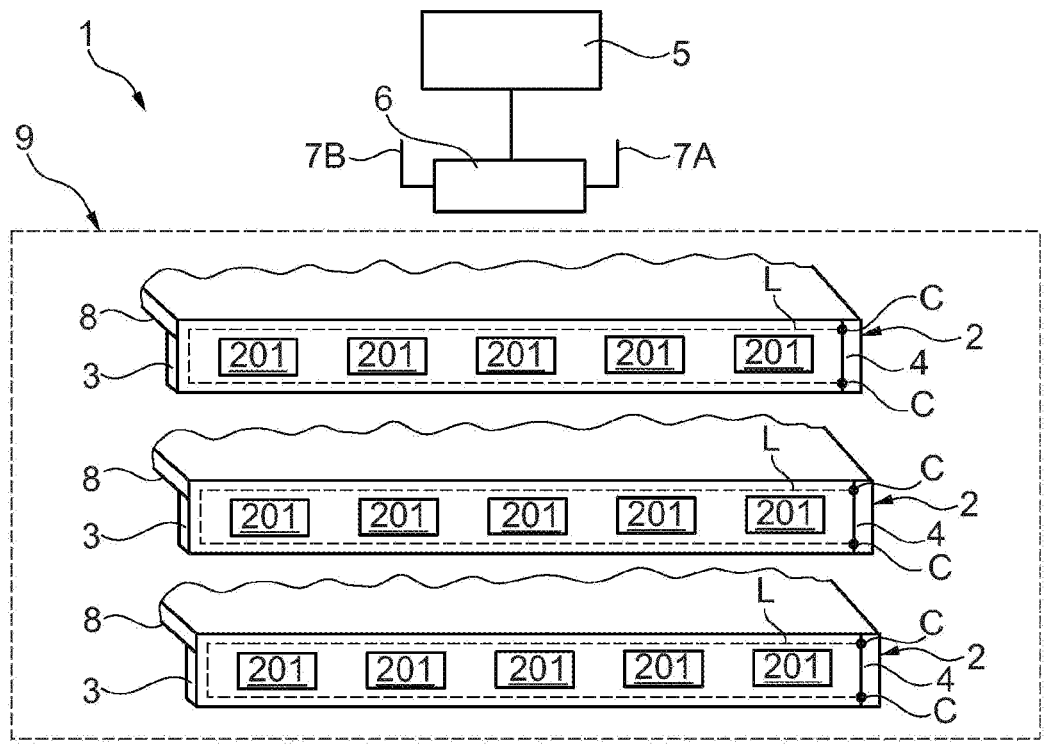
FIG. 12 schematically shows a system part with system components according to the FIGS. 4-6.

In the following, reference is made to FIG. 12 for discussing the mode of operation of the system 1 with its system components according to the second embodiment. Similarly to during operation of the system 1 according to FIG. 10, during operation of the system 1 according to FIG. 12, groups of clients 2 are transferred from the sleep mode to the active mode in a time interval, in order to then communicate according to the WLAN wireless standard with the access point 6. In the present case, this group of the clients 2 is represented by the three units of the supply devices 4 installed on the shelving unit 9. As soon as the three supply devices 4 are in their active mode, they receive the data D intended for the respective shelf label display 201, activate the shelf label displays 201 with the aid of their NFC interface 18 and in the process supply the shelf label displays 201 with electrical energy and in the process transmit the data D intended for the shelf label displays 201 to the same. Subsequently, the three supply devices 4 change back to their sleep mode. Subsequently, other groups of the clients 2 can be activated collectively in subsequent time intervals and therefore sequentially carry out a WLAN wireless communication with the access point 6 in the respective time interval. In the present case, even more shelf label displays 201 can be operated wirelessly, because in each group of the supply devices 4 addressed per time interval, each supply device 4, considered as a client 2 in itself, again supplies a group of the shelf label displays 201.

Figure 7:
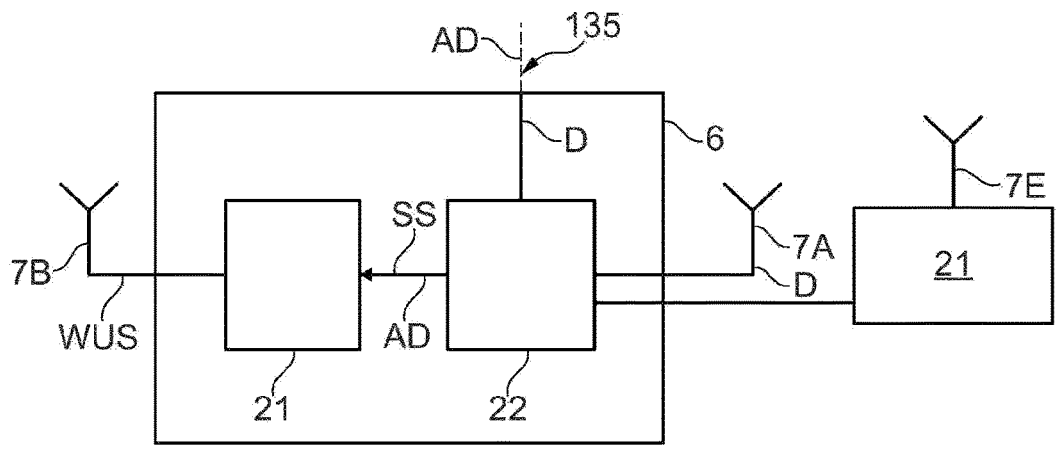
FIG. 7-9 schematically show system components of the system according to a third exemplary embodiment.
Figure 8:
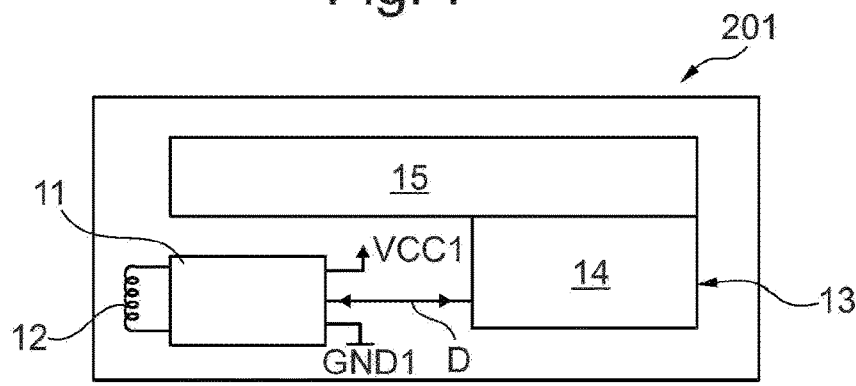

In the following, the wireless system components of the system 1 are discussed according to a third exemplary embodiment with the aid of FIGS. 7-9. In this system 1, it is possible to supply the supply device 4, which is functioning as client 2, with electrical energy contactlessly, that is to say wirelessly. In this case, technology is used, which is known under the term "power over WiFi".

To this end, the access point 6 is coupled to a supply transmitter 10, which is designed to send directed wireless signals for the purpose of transmitting energy. In addition to its electronics (not illustrated in detail), the supply transmitter 10 has an antenna configuration 7E (which comprises a number of individual antennas), with the aid of which the direction of the energy transmission (ultimately the directed propagation of the wireless signal, which is sent with e.g. 5 watts) can be set relatively precisely, so that the transmitted energy arrives precisely at a selected supply device 4.

The shelf label display 201 visualized in FIG. 8 corresponds exactly to that of FIG. 5 and has already been discussed in detail in connection with FIG. 5.

Figure 9:
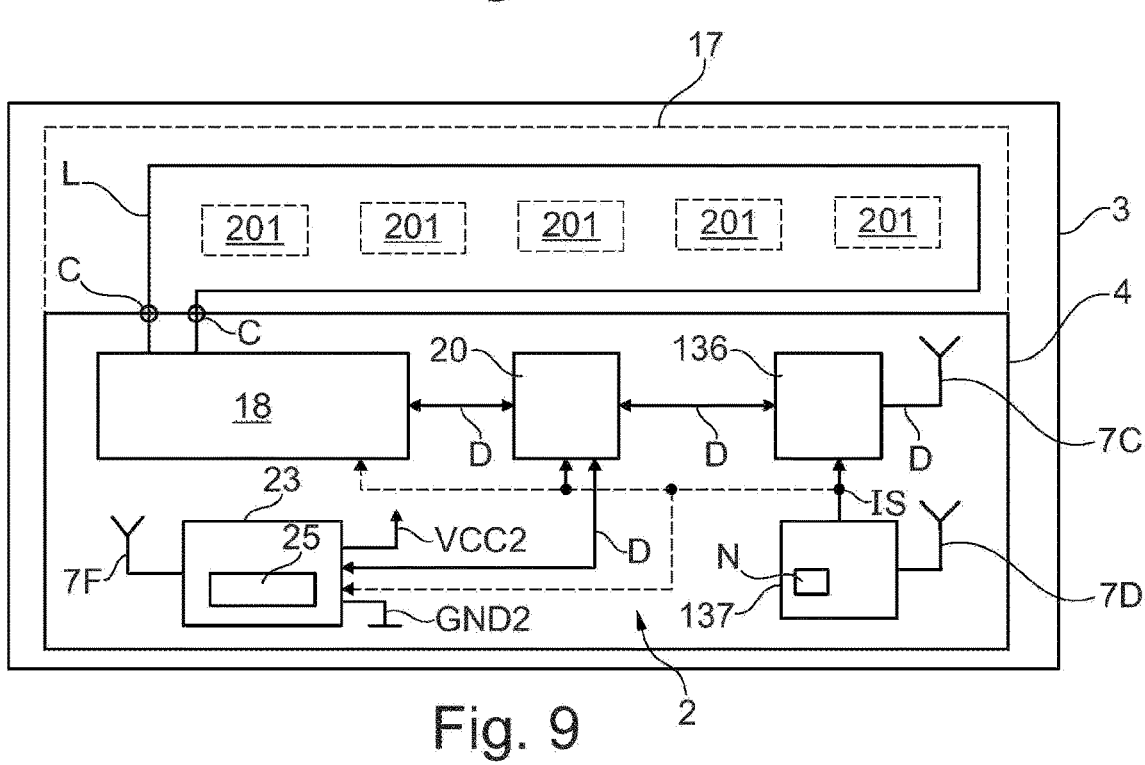

The supply device 4, which is modified compared to FIG. 6, is illustrated in FIG. 9. The supply device 4 is designed both for its own contactless supply with energy and also for contactlessly supplying the shelf label displays 201 with energy. For its own supply, it has a supply receiver 23 which is suitable for receiving the previously discussed energy-transmitting wireless signals and is equipped with an antenna configuration 7F (which can have a plurality of antennas) and electronics (not illustrated in detail), which are designed to receive the energy-transmitting wireless signal and to store the energy transmitted therewith in an internal electrical energy storage device 25 (chargeable battery, rechargeable battery) and to generate the second supply voltage VCC2 in relation to a second reference potential GND2.

Figure 13:
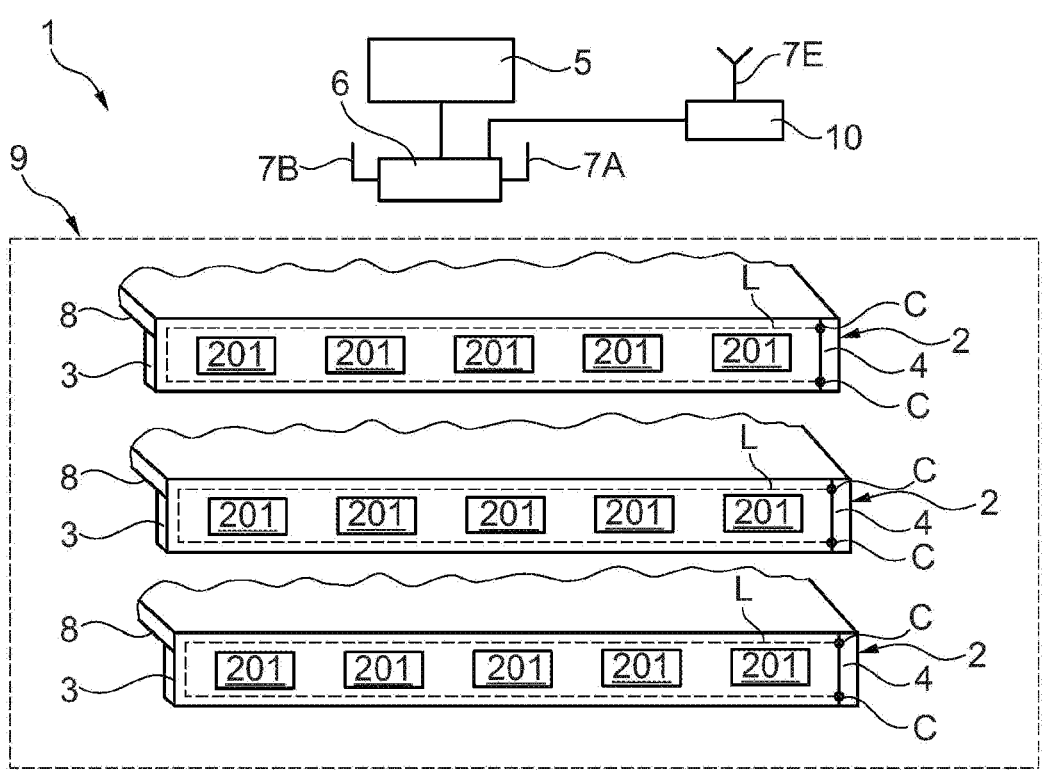
FIG. 13 schematically shows a system part with system components according to the FIGS. 7-9.

A section of the system 1 according to the third embodiment, which is required for the current discussion, is visualized in FIG. 13.

For the function and mode of operation of the wireless wake-up receiver 137, reference is made at this point to the preceding discussions according to FIG. 9. In the present context, however, it is added that in addition to the active components 18 and 136, where necessary, a control unit 20 and the supply receiver 23 may also be controllable by the wireless wake-up transmitter with regards to the sleep or active mode, which is indicated by a line, which is illustrated dashed and which conveys the interrupt signal IS to this components 18, 20 and 23. Therefore, the control unit 20 and if appropriate also the supply receiver 23 is also included by the said sleep mode and active mode. Here also, the shelf label display 201 can otherwise only be supplied with energy in active mode and is therefore also only active itself in this mode.

During operation, that is to say in the active mode, the supply device 4 can query or monitor the state of charge of the energy storage device 25, for example with the aid of the control unit 20. As soon as the state of charge falls below a certain level, the control unit 20 can request a (re)charge with the aid the WLAN wireless communication. This request is received by the access point 6 to which the supply device 4 is logically (wirelessly) assigned. Since the exact geographical position (the three-dimensional coordinates) of each of the supply devices 4 and their unique identifier is known in the system 1 (e.g. with the aid of the server 5), the supply transmitter 10 coupled to the relevant access point 6 can send the energy-transmitting wireless signal in a precisely directed manner towards the position of the respective supply device 4 requesting charging. The energy-transmitting wireless signal is received there, and the energy transmitted with the aid thereof is used to charge the internal energy storage device 25 there.

The directed energy transmission can also take place systematically, that is to say in each case when the supply device 4 is currently in active mode. Therefore, no explicit querying of the state of charge and requesting the energy supply during the WLAN wireless communication in the respective time interval is necessary, which may contribute to system efficiency.

It is also mentioned at this point that the access points 6 and also the clients 2 can have UWB-enabled wireless modules (UWB stands for "Ultra-WideBand" here), with the aid of which the position of the individual clients 2 can be determined relatively precisely in a search mode of the system 1 by means of cooperation of the access points 6 (coordinated UWB wireless communication of a client 2 with a multiplicity of the access points 6).

Furthermore, it is mentioned that the access point 6 does not have to contain an integrated wireless wake-up transmitter 21. The access point 6 can also contain a data interface, such as e.g. a USB connection (socket) with USB interface and be designed for controlling an external wireless wake-up transmitter 21, wherein in this case the send control signal SS and the data content AD about the data interface, to which the external wireless wake-up transmitter 21 is connected, are output to the external wireless wake-up transmitter 21. In the case of the USB implementation, the wireless wake-up transmitter 21 can for its part have a USE connection (plug) with USB interface and be designed to be of similar form to a USB stick.

Furthermore, the system 1 can also be structured such that a conventional standard access point is used as primary access point, which handles the communication with the server 5. This standard access point communicates according to a wireless standard, here e.g. WLAN, with the access point 6 according to the invention, which here takes on the role of a gateway or a relay station. With the aid of the wireless wake-up transmitter 21, in this system 1 also, the client 2, which may be designed as explained previously, is transferred from its sleep mode to its active mode. In the present case, the client wireless module 136 does not however initiate the any standard-conform communication with the access point 6, but rather carries out the connection set-up and the subsequent WLAN communication with the standard access point directly. In this system 1, it is also possible that e.g. image contents intended for the client 2 are transmitted to the addressed wireless wake-up receiver 137 with the aid of the wireless wake-up transmitter 21. Although this takes place relatively slowly, it is extremely energy-saving for that.

Therefore, the system 1 can be configured such that the standard access points are installed at larger distances with respect to one another in a business premises and the access points 6 are installed at smaller distances between them as relay stations. As mentioned, the standard access points are connected to the access points 6 via WLAN communication and the access points 6 control the clients 2 depending on a request from the server 5. This may relate to the transmission of image contents for the display device of the clients 2 or the request that selected clients 2 connect either to one of the access points 6 by means of WLAN communication or create a WLAN connection to one of the standard access points.

Finally, it is also mentioned that a remote control may also be used in the system 1, which has the design of the access point 6 with regards to its wireless system, that is to say can have the WLAN-enabled access point wireless module 22 and the wireless wake-up transmitter 21. This remote control can be connected to the server 5 via WLAN (e.g. using one of the access points 6 or a different standard access point). Should a certain client 2 or a group of such clients 2 then be controlled remotely, an addressed wake up of the relevant client(s) 2 can take place with the aid of the wireless wake-up transmitter 21 installed in the remote control, which contributes to a rapid handling of the remote control tasks.

Finally, it is once more pointed out that the figures previously described in detail are only concerned with exemplary embodiments, which can be modified in many different ways by the person skilled in the art, without departing from the scope of the invention. For the sake of completeness, it is also pointed out that the use of the indefinite article "a" or "an" does not mean that the relevant features cannot also be present multiple times.

The invention claimed is:

1. An electronic shelf label system (1), which comprises:
at least one battery operated shelf label client (2), which comprises an energy-saving sleep mode without wireless communication readiness according to a wireless standard and an active mode with wireless communication readiness according to the wireless standard, and which comprises a wireless wake-up receiver (137), which is designed to cause the quitting of the sleep mode and the adoption of the active mode when a wake-up (WUS) signal is received and which has a current consumption of less than 3 µA for a supply voltage of 1.8 volts and a data rate of 1 kbit/s, and
an access point (6) which is designed for wireless communication according to the wireless standard, with the at least one shelf label client (2), and which comprises a wireless wake-up transmitter (21) for transmitting the wake-up signal (WUS), wherein the wireless wake-up transmitter (21) is designed to be controllable by the access point (6) with regards to the time of transmission of the wake-up signal (WUS) and the access point (6) defines the time as the initiation of a wireless connection set-up according to the wireless standard for the at least one shelf label client (2), particularly with wait time for the change from the sleep mode to the active mode.

2. The system (1) according to claim 1,
wherein the access point (6) is designed for transmitting data content (AD) to the wireless wake-up transmitter (21), wherein the data content (AD) is used for addressing a wireless wake-up receiver (137) or a group of wireless wake-up receivers (137), and
wherein the wireless wake-up transmitter (21) is designed to send the data content (AD) in the wake-up signal (WUS) or in addition to or delayed with respect to the wake-up signal (WUS), and
wherein the wireless wake-up receiver (137) of the at least one shelf label client (2) is designed for detecting the data content (AD) and for checking whether it is addressed by the data content (AD).

3. The system (1) according to claim 2, wherein such a group comprises a number of 2 to 20 wireless wake-up receivers (137).

4. The system (1) according to claim 2, wherein the access point (6) is designed for addressing one group of the wireless wake-up receivers (137) in successive time intervals in each case.

5. The system (1) according to claim 1, wherein the wireless standard is a WLAN standard.

6. The system (1) according to claim 2, wherein the wireless wake-up receiver (137) is designed to generate an activation signal (IS) when addressing is detected and to output the same to a client wireless module (136) of the shelf label client (2), which is designed for wireless communication according to the wireless standard, wherein the client wireless module (136) is designed to adopt its active mode as a consequence of the occurrence of the activation signal (IS), in which initially a wireless connection set-up and subsequently a wireless communication with the access point (6) can be carried out according to the wireless standard.

7. The system (1) according to claim 1, wherein the wireless wake-up receiver (137) is permanently in the ready-to-receive state.

8. The system (1) according to claim 1, wherein the shelf label client (2) realizes an electronic shelf label (200).

9. The system (1) according to claim 1, wherein the shelf label client (2) realizes an electronic supply device (4) for the contactless energy supply of a battery-free electronic shelf label (201).

10. A method for operating an electronic shelf label system (1),
wherein the system (1) comprises at least one battery operated shelf label client (2), which comprises an energy-saving sleep mode without wireless communication readiness according to a wireless standard and an active mode with wireless communication readiness according to the wireless standard, and
wherein the system (1) furthermore comprises an access point (6), which is designed for wireless communication according to the wireless standard with the at least one shelf label client (2),
wherein according to the method, under the control of the access point (6) with the aid of a wireless wake-up transmitter (21) of the access point (6), a wake-up signal (WUS) is sent at the time at which a wireless connection set-up according to the wireless standard is to be initiated in the at least one shelf label client (2), particularly with sufficient wait time for a change from the sleep mode to the active mode, and
wherein in the shelf label client (2), the wake-up signal (WUS) is received with the aid of a wireless wake-up receiver (137), which has a current consumption of less than 3 µA for a supply voltage of 1.8 volts and a data rate of 1 kbit/s, and the sleep mode is quit and the active mode is adopted.

11. The method according to claim 10, wherein
the access point (6) transmits data content (AD) to the wireless wake-up transmitter (21), wherein the data content (AD) is used for addressing a wireless wake-up receiver (137) or a group of wireless wake-up receivers (137), and
the wireless wake-up transmitter (21) sends the data content (AD) in the wake-up signal (WUS) or in addition to the wake-up signal (WUS), and
the wireless wake-up receiver (137) of the shelf label client (2) detects the data content (AD) and checks whether it is addressed by the data content (AD).

12. The method according to claim 11, wherein the access point (6) addresses one group of wireless wake-up receivers (137) in successive time intervals in each case.

13. The method according to claim 10, wherein a WLAN standard is used as wireless standard.

* * * * *